(12) United States Patent
Tada

(10) Patent No.: US 6,612,953 B2
(45) Date of Patent: Sep. 2, 2003

(54) BLADE TENSIONER

(75) Inventor: Naosumi Tada, Nabari (JP)

(73) Assignee: Borg Warner Morse TEC Japan K.K. (JP)

( * ) Notice: Subject to any disclaimer, the term of this patent is extended or adjusted under 35 U.S.C. 154(b) by 0 days.

(21) Appl. No.: 09/871,865

(22) Filed: Jun. 1, 2001

(65) Prior Publication Data
US 2002/0115511 A1 Aug. 22, 2002

(30) Foreign Application Priority Data
Jun. 15, 2000 (JP) .................. 2000-179420

(51) Int. Cl.⁷ .............. F16H 7/08; F16H 7/22
(52) U.S. Cl. .................. 474/111; 474/140
(58) Field of Search ............ 474/111, 140, 474/110, 101, 109, 112, 91; 267/53, 49, 48

(56) References Cited
U.S. PATENT DOCUMENTS 2,355,003 A * 8/1944 McCann ............ 474/111
2,873,962 A * 2/1959 Lampman et al. ........ 267/49
3,673,884 A * 7/1972 Southiere ............. 474/111
3,703,967 A * 11/1972 Gessler .................. 267/53
4,850,934 A * 7/1989 Gibson et al. .......... 474/111
5,662,540 A * 9/1997 Schnuepke et al. ...... 474/111
6,428,435 B1 * 8/2002 Kumakura et al. ...... 474/111
6,440,020 B1 * 8/2002 Tada .................... 474/111

FOREIGN PATENT DOCUMENTS

FR 657.976 * 5/1929 ............. 474/111
JP 60-155046 * 8/1985 ............ 474/111
JP (2002)-141001 * 5/2001

* cited by examiner

*Primary Examiner*—Marcus Charles
(74) *Attorney, Agent, or Firm*—Fitch, Even, Tabin & Flannery; Greg Dziegielewski

(57) ABSTRACT

A blade tensioner is configured with blade shoe having chain sliding face, base that supports base part of blade shoe while allowing it to pivot freely, and blade spring in which base part is fixed to tip part of blade shoe. Warped part provided at the tip contacts inner face of blade shoe, and curved part provided at the midpoint of base contacts sliding face of base. In this case, the damping force of the blade tensioner increases due to sliding resistance generated between warped part of blade spring and inner face and between curved part and sliding face.

20 Claims, 2 Drawing Sheets

BLADE TENSIONER

FIELD OF THE INVENTION

The present invention pertains to a blade tensioner for applying tension to a chain, and in particular to a blade tensioner having a blade shoe with a chain sliding face, a plate-like blade spring for applying spring force to the blade shoe, and a base for supporting the blade shoe at one end while allowing it to pivot freely.

BACKGROUND OF THE INVENTION

A blade tensioner is often used to apply tension to a chain. A conventional tensioner may be configured primarily with a blade shoe having a chain sliding face, a base which allows the base part of a blade shoe to pivot freely and its tip part to slide freely, and several plate-like blade springs stacked on the side opposite the chain sliding face of the blade shoe in order to apply spring force to the blade shoe.

During the operation of the chain, the chain may advance while sliding on the chain sliding face of the blade shoe. At this time, a load generated by the deformation of the blade shoe and the blade springs is applied to the chain, so that constant tension of the chain can be maintained. In addition, vibrations due to slippage of the chain and/or fluctuations in tension are propagated to the respective blade springs in the blade shoe via the blade shoe. At this time, when the respective blade springs are subjected to repeated elastic deformation, a damping force can be created by means of adjoining blade springs sliding against each other, in order to damp the vibrations of the chain.

Incidentally, the conventional blade tensioner is used, e.g., for an oil-pump drive chain, at a position where the inter-axial distance in the engine is relatively short. On the other hand, due to the demand for low cost engines, the use of a blade tensioner which can be produced relatively inexpensively by means of a simple structure for a cam chain driven between the crank shaft and the cam shaft is also in demand.

However, if an attempt is made to apply an unmodified blade tensioner to a long chain, such as a cam chain, with a long inter-axial distance, the total length of the blade shoe and the blade spring may have to be increased, the natural frequency of the blade tensioner can drop, and the resonance frequency of the blade tensioner can decrease. As a result, the blade tensioner may resonate within the duty cycle range of the engine, which may result in fatigue breakdown.

Thus, a blade tensioner capable of preventing fatigue breakdown by preventing such resonance in the duty cycle range of the engine has been suggested by the present applicant, such as disclosed in Japanese Patent Application No. Hei 11[1999]-207816.

In the aforementioned blade tensioner, the position where the blade spring or the blade shoe contacts the base is at the midpoint of the blade shoe; whereby, frequency of the blade tensioner can be set relatively high. As a result, resonance of the blade tensioner in the duty cycle range of the engine can be prevented, so that fatigue breakdown due to resonance can be prevented.

On the other hand, for recent applications of blade tensioners, there is great demand for a blade tensioner capable of applying even greater damping forces to the chain. However, this need may not be satisfied sufficiently by the aforementioned blade tensioner.

SUMMARY OF THE INVENTION

The blade tensioner according to an aspect of the invention comprises a blade shoe having a sliding face on which the chain slides; a base supporting the aforementioned blade shoe at one end while allowing it to pivot freely; and a plate-like blade spring that is fixed at one end to one of the ends of the aforementioned blade shoe, that contacts the side opposite the aforementioned chain sliding face of the aforementioned blade shoe at the other end, and that contacts the aforementioned base within its curved middle section in order to apply spring force to the aforementioned blade shoe.

In a blade tensioner according to an aspect of the invention, when vibrations due to slippage of the chain and/or fluctuations in tension are applied to the blade shoe, not only may sliding resistance be generated as the curved part at the midpoint of the blade spring slides against the base, but sliding resistance may also be generated as the other end of the blade spring slides against the side of the blade shoe opposite the chain sliding face, so that the damping force of the blade tensioner can be further improved by this sliding resistance.

In this case, a friction material may be provided at the other end of the blade spring or the side of the blade shoe opposite the chain sliding face. Alternatively, a friction material may be provided at the curved part of the blade spring or the contact face between the curved part of the blade spring and the base. When this kind of friction material is provided, a blade tensioner with increased damping force can be realized.

Although the friction material can be provided by means of bonding, welding, or coating, it may also be injection-molded. Furthermore, the friction material may consist of rubber, plastic, or friction paper.

Preferably, the blade shoe has a cross section with a U-like shape. This allows the rigidity of the blade shoe to be improved, so that vibrations of the chain can be controlled more easily.

In another aspect of the blade tensioner, a friction material is provided at the aforementioned other end of the aforementioned blade shoe.

In another aspect of the blade tensioner, the aforementioned friction part is attached to the aforementioned other end of the aforementioned blade spring by means of bonding, welding, or coating.

In another aspect of the blade tensioner, a friction material which contacts the aforementioned other end of the aforementioned blade spring is provided on the reverse face of the aforementioned chain sliding face of the aforementioned blade shoe.

In another aspect of the blade tensioner, the aforementioned friction material is attached to the side opposite the aforementioned chain sliding face of the aforementioned blade shoe by means of bonding, welding, or coating.

In another aspect of the blade tensioner, the aforementioned friction material is injection-molded onto the side opposite the aforementioned chain sliding face of the aforementioned blade shoe.

In another aspect of the blade tensioner, a friction material is provided at the contact face between the aforementioned curved part of the aforementioned blade spring and the aforementioned base.

In another aspect of the blade tensioner, the aforementioned friction material is attached to the aforementioned curved part of the aforementioned blade spring by means of bonding, welding, or coating.

In another aspect of the blade tensioner, a friction material is provided at the contact face between the aforementioned base and the aforementioned curved part of the aforementioned blade spring.

In another aspect of the blade tensioner, the aforementioned friction material is attached to the aforementioned base by means of bonding, welding, or coating.

In another aspect of the blade tensioner, the aforementioned friction material may comprise rubber, plastic, or friction paper.

DETAILED DESCRIPTION OF PREFERRED EMBODIMENTS

Figure 1:
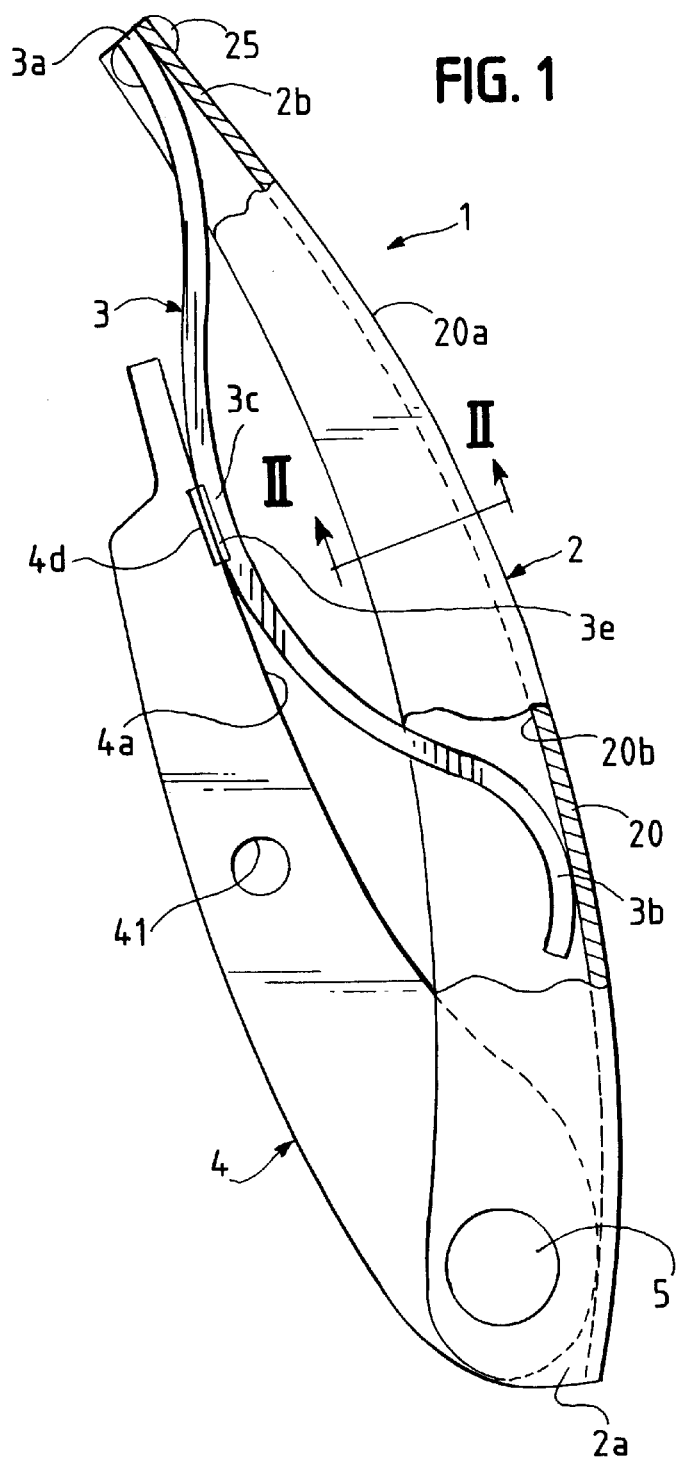
FIG. 1 is a partially cut-away side view of a blade tensioner in accordance with an aspect of the present invention.

FIG. 1 shows a blade tensioner in accordance with an aspect of the present invention. As shown in FIG. 1, said blade tensioner 1 is configured with plastic blade shoe 2 curved like an arc, plate-like blade spring 3 for applying spring force to blade shoe 2, and base 4 for supporting blade shoe 2.

Figure 2:
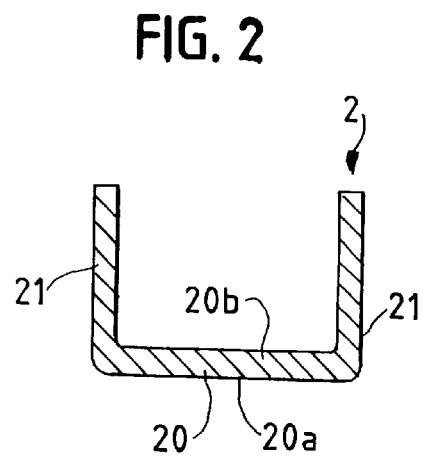
FIG. 2 is a cross section of FIG. 1 along the line II—II.

As shown in FIG. 2, blade shoe 2 has a cross section with approximately U-like shape and is configured with bottom wall 20 and side walls 21 project at a right angle to both ends of said bottom wall. Outer side 20a of bottom wall 20 constitutes a sliding face on which a chain (not illustrated) slides. Base part 2a of blade shoe 2 is attached to base 4 using pin 5 in such a manner that it can pivot freely.

Base part 3a of blade spring 3 is fixed to tip part 2b of blade shoe 2 using rivet 25, and warped part 3b at the tip contacts inner face 20b of bottom wall 20 of blade shoe 2. Curved part 3c is created at the midpoint of blade spring 3, and said curved part 3c contacts sliding face 4a of base 4. In this case, because the total length of blade spring 3 is shorter than the total length of blade shoe 2, the resonance frequency of the blade tensioner is relatively high. As a result, resonance of the blade tensioner can be prevented within the duty cycle range of the engine. Furthermore, bolt hole 41 is created in base 4 in order to insert a bolt for mounting onto the engine.

In the case of the blade tensioner with this kind of configuration, blade spring 3 is subjected to repeated elastic deformation due to vibrations caused by slippage of the chain and/or fluctuations of tension acting upon blade shoe 2. At this time, sliding resistance is not only generated as curved part 3c at the midpoint of blade spring 3 slides against sliding face 4a of base 4, but sliding resistance is also generated as warped part 3b provided at the top of blade spring 3 slides against inner face 20b provided on the side opposite the chain sliding face of blade shoe 2. The damping force of the blade tensioner is further increased by this sliding resistance.

In this case, the friction material 3d or 20d may be provided either on warped part 3b of blade spring 3 or on inner face 20b of blade shoe 2, which face contacts said warped part 3b, or it can be provided on both of these parts. Furthermore, the friction material 3e or 4d may be provided either on warped part 3c of blade spring 3 or on sliding face 4a of base 4, which face contacts said warped part 3c, or it can be provided on both of these parts.

Although rubber and plastic, for example, can be used for the friction material, if rubber is to be used, silicon rubber is preferable to nitryl rubber from the viewpoint of thermal tolerance and abrasion resistance; and if plastic is to be used, nylon resin, particularly nylon 66, is desirable. Furthermore, a friction paper utilized commonly as a facing material may also be utilized. These friction materials are attached by means of bonding, welding (including sintering), or coating. Furthermore, the friction material can be attached to blade shoe 2 burying it in inner face 20b by means of an injection-molding method simultaneously with the formation of the resin for blade shoe 2.

When such a friction material is provided, the sliding resistance between warped part 3b and inner face 20b and the sliding resistance between warped part 3c and sliding face 4a due to deformation of blade spring 3 increase, so that a blade tensioner with damping force can be realized due to said increased sliding resistance.

Furthermore, as described above, because blade shoe 2 has a cross section with a U-like shape, the rigidity of blade shoe 2 is improved, so that vibrations of the chain can be controlled more easily.

Figure 3:
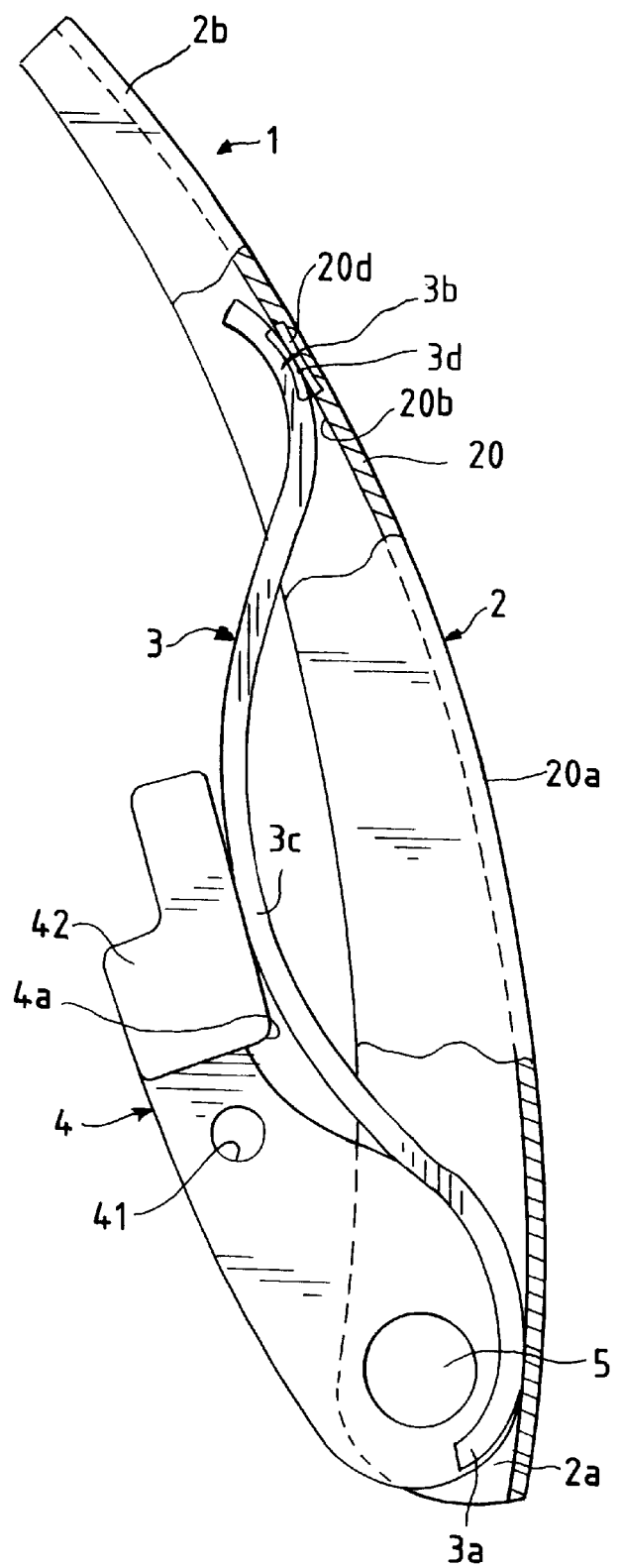
FIG. 3 is a partially cut-away side view of a blade tensioner in accordance with an aspect of the present invention.

FIG. 3 shows a blade tensioner in accordance with another aspect of the present invention. In FIG. 3, the same symbols as those in the aforementioned embodiment indicate identical or equivalent parts. This embodiment is different from the aforementioned embodiment in that base part 3a of blade spring 3 is fixed to base 4 at base part 2a of blade shoe 2, and that plastic sliding block 42 is provided at the tip of base 4. Sliding block 42 is fixed to the tip of base 4, such as by using one or more screws.

In this case, blade spring 3 is subjected to repeated elastic deformation due to vibrations caused by slippage of the chain and/or fluctuations of tension acting upon blade shoe 2. At this time, sliding resistance not only is generated as curved part 3c at the midpoint of blade spring 3 slides against sliding face 4a of sliding block 42 provided at the tip of the base, but sliding resistance is also generated as warped part 3b provided at the tip of blade spring 3 slides against the face opposite the chain sliding face of blade shoe 2, that is, inner face 20b. The damping force of the blade tensioner is further increased by this sliding resistance.

As described in detail above, the effect of the blade tensioner pertaining to the present invention is that, because the curved part at the midpoint of the blade spring contacts the base, and the other end of the blade spring contacts the other side of the chain sliding face of the blade shoe, the sliding resistance due to the deformation of the blade spring is increased, and thus the damping force of the blade tensioner can be further increased.

What is claimed is:

1. A blade tensioner for applying tension to a chain comprising:

a blade shoe having a first face and an opposing second face, the first face having a chain sliding surface on which the chain is slidable;

a base pivotably supporting an end of the shoe;

a blade spring biasing the shoe relative to the base, the spring having a first end, a second end, and an arcuate section disposed between the first and second ends, the first spring end generally fixed relative to the shoe, the spring arcuate section contacting the base, a portion of the blade spring between the first spring end and the spring arcuate section free of contact with the base, and the second end of the spring in slidable contact against the second shoe face; and the second spring end and the second shoe face selected to provide sliding resistance therebetween effective to damp vibrations of the tensioner.

2. A blade tensioner according to claim 1, wherein a friction surface is disposed on the second spring end to provide a coefficient of friction between the second spring end and the second shoe face effective to damp vibrations of the tensioner.

3. A blade tensioner according to claim 2, wherein the friction surface is disposed on the second spring end by bonding, welding, or coating.

4. A blade tensioner according to claim 2, wherein the friction surface comprises rubber, plastic, or friction paper.

5. A blade tensioner according to claim 1, wherein a friction surface is disposed on the second shoe face where the second spring end is slidable to provide a coefficient of friction between the second spring end and the second shoe face effective to damp vibrations of the tensioner.

6. A blade tensioner according to claim 5, wherein the friction surface is disposed on the second shoe face where the second spring end is slidable by bonding, welding, or coating.

7. A blade tensioner according to claim 5, wherein the friction surface is molded onto the second shoe face where the second spring end is slidable.

8. A blade tensioner according to claim 1, wherein the arcuate spring section and the base are selected to provide sliding resistance therebetween effective to damp vibrations of the tensioner.

9. A blade tensioner according to claim 1, wherein the shoe has a cross section with an approximately U-like shape.

10. A blade tensioner for applying tension to a chain comprising:
   a blade shoe having a first face and an opposing second face, the first face having a chain sliding surface on which the chain is slidable;
   a base pivotably supporting an end of the shoe;
   a blade spring biasing the shoe relative to the base, the spring having a first end, a second end, and an arcuate section disposed between the first and second ends, the first spring end generally fixed to the shoe, the spring arcuate section contacting the base, and the second end of the spring in slidable contact against the second shoe face; and
   the arcuate spring section and base selected to provide sliding resistance therebetween effective to damp vibrations of the tensioner.

11. A blade tensioner according to claim 10, wherein a friction surface is disposed on the base where the arcuate spring section is slidable to provide a coefficient of friction therebetween effective to damp vibrations of the tensioner.

12. A blade tensioner according to claim 11, wherein the friction surface is disposed on the base by bonding, welding, or coating.

13. A blade tensioner according to claim 11, wherein the friction surface comprises rubber, plastic, or friction paper.

14. A blade tensioner according to claim 10, wherein a friction surface is disposed on the arcuate spring section to provide a coefficient of friction between the arcuate spring section and the base effective to damp vibrations of the tensioner.

15. A blade tensioner according to claim 14, wherein the friction surface is disposed on the arcuate spring section by bonding, welding, or coating.

16. A blade tensioner according to claim 10, wherein the shoe has a cross section with an approximately U-like shape.

17. A blade tensioner for applying tension to a chain in an automotive engine system, the blade tensioner having a natural resonance frequency, and the engine system having a duty cycle range, the blade tensioner comprising:
   a blade shoe having a chain sliding face against which the chain is slidable;
   a base member pivotably supporting the shoe;
   a spring blade having a portion contacting the shoe to bias the shoe from the base, the spring having an intermediate portion approximately at a midpoint of the spring contacting the base member, the spring having a length smaller than a length of the shoe effective to increase the natural frequency of the blade tensioner; and
   the spring portion and the shoe selected to provide sliding resistance therebetween effective to increase the natural frequency of the blade tensioner.

18. The blade tensioner of claim 17 wherein the sliding resistance between the spring portion and the shoe and the length of the spring relative to the shoe are effective to increase the natural frequency beyond the duty cycle range of the engine.

19. A blade tensioner for applying tension to a chain in an automotive engine system, the blade tensioner having a natural resonance frequency, and the engine system having a duty cycle range, the blade tensioner comprising:
   a blade shoe having a chain sliding face against which the chain is slidable;
   a base member pivotably supporting the shoe;
   a spring blade attached to the shoe and biasing the shoe from the base, the spring having a portion contacting the base, the spring having a length smaller than a length of the shoe effective to increase the natural frequency of the blade tensioner; and
   the spring portion and the base selected to provide sliding resistance therebetween effective to increase the natural frequency of the blade tensioner.

20. A blade tensioner according to claim 19, wherein the sliding resistance between the spring portion and the base and the length of the spring relative to the shoe are effective to increase the natural frequency beyond the duty cycle range of the engine.

* * * * *